United States Patent [19]

Merriman

[11] 4,383,554

[45] May 17, 1983

[54] FLEXIBLE PIPE

[75] Inventor: Horace B. Merriman, South Ascot, England

[73] Assignee: Mobil Oil Corporation, New York, N.Y.

[21] Appl. No.: 282,994

[22] Filed: Jul. 14, 1981

[30] Foreign Application Priority Data

Jul. 31, 1980 [GB] United Kingdom ................ 8025015

[51] Int. Cl.³ .............................................. F16L 11/18
[52] U.S. Cl. .................................... 138/101; 138/102;
   138/108; 138/109; 138/120; 138/138; 138/147;
                  138/155; 138/174; 166/350; 285/249
[58] Field of Search ............... 138/100, 101, 102, 109,
           138/108, 138, 139, 174, 127, 120, 147, 155

[56] References Cited

U.S. PATENT DOCUMENTS 2,079,598  5/1937  Berkowitz ............................ 138/139
3,538,956  11/1970  Helbing et al. ..................... 138/120

FOREIGN PATENT DOCUMENTS 20860  of 1893  United Kingdom ................ 138/127
863360  3/1961  United Kingdom ................ 138/108

OTHER PUBLICATIONS

Pressure Vessel Handbook–4th Ed., Pressure Vessel Handbook Publishing, Inc., 1977, p. 13.
The Random House College Dictionary–Rev. Ed., Random House, Inc., p. 1137.

Primary Examiner—Stephen Marcus
Assistant Examiner—Mark Thronson
Attorney, Agent, or Firm—Charles A. Huggett; Michael G. Gilman; Frank J. Kowalski

[57] ABSTRACT

A flexible pipe comprising a first set of stress bearing elements extending substantially the whole length of the pipe, for accommodating maximum hoop stress resulting from flow of pressurized fluid through the pipe, and a second set of stress bearing elements extending substantially the whole length of the pipe for accommodating longitudinal stress resulting from a flow of pressurized fluid through the pipe.

18 Claims, 14 Drawing Figures

FLEXIBLE PIPE

This invention relates to flexible pipes and particularly to pipes capable of withstanding high internal pressures, of the order of 4000/8000 lb per sq. inch or more and which are sufficiently flexible to allow for repeated movements and quite severe flexing to take place without damage to the pipe.

A particular requirement for such a pipe is in the under-sea oil and gas well industry.

Currently most under-sea oil wells have large and expensive rigs or platforms which act as centres for collecting the oil and loading it into tankers or feeding it into reservoirs or to pipes to convey it to the nearest land.

It would be very attractive to have a simple sea-bed terminal for an oil or gas well and then to connect the sea-bed terminal to a buoy or receiving ship, on the surface of the sea, by means of a long flexible pipe. Such a flexible pipe, to be adequate for use in the type of oil well which is now being developed beneath the oceans, would have to stand up to pressures of the order of 5000/7000 lbs per sq. inch or more. Existing flexible pipes are not capable of standing up to such pressures and at the same time standing up to repeated flexing and movement which takes place when a pipe runs freely from the sea-bed to the surface of the ocean over a considerable distance.

It is an object of this invention to provide a flexible pipe for gas or liquid flow which is enabled to flex freely and at the same time to stand up to high pressures.

In the past pipes have been made of helically wound metal strips and have been satisfactory if they are not subjected to repeated flexure under high internal pressures. If such pipes are subjected to repeated flexure they tend to constrict under axial tension and this can lead to pipe failure under arduous conditions.

In accordance with the present invention the axial tensions and the hoop stresses which arise in use of the pipe are separately provided for. This permits the pipe to be designed so as to resist varying combinations of hoop stress and axial loading without having the design factors for one type of loading interfere with the design factors for the other type of loading, i.e. a resolution of load resistance is achieved.

A first embodiment of the invention lies in a flexible pipe comprising two sets of stress bearing elements, each set extending substantially the whole length of the pipe, one of the sets of the pipe elements being constructed and arranged so as to be capable of accommodating the whole of the maximum hoop stress resulting from the flow of pressurised fluid through the pipe, and the other set of elements being constructed and arranged so as to accommodate the whole of the corresponding longitudinal stress.

The elements designed to carry the hoop stress may be in the form of rings, and the wall thickness of the rings is preferably at least twice that of the elements designed to accommodate longitudinal stress.

The elements designed to carry the longitudinal stress are preferably located radially outwardly of the elements designed to carry the hoop stress.

The elements designed to carry the longitudinal stress may be in the form of a series of keepers which are arranged to hold the hoop stress elements in place and limit relative movement of the hoop stress carrying elements. The keepers are preferably circumferentially staggered around the hoop stress carrying elements, and may be in the form of narrow resilient bars.

A second embodiment of the invention lies in a flexible pipe comprising a plurality of loosely interengaged rings which allow limited relative axial and radial movement, thus permitting the pipe to flex both radially and longitudinally, the rings being held in place by a plurality of keepers arranged externally of the rings and extending longitudinally of the pipe, the keepers being arranged both to hold the rings in place and to limit the relative movement of the rings, the pipe also including an outer fluid-tight covering and at least one inner fluid-tight liner, the rings being so constructed and arranged and being of such thickness and tensile strength as to withstand the maximum hoop stress developed internally in the pipe when high pressure fluid is flowing through it, and the keepers being of sufficient high tensile strength to withstand the endwise or longitudinal stresses developed in the pipe when fluid is flowing through it, the rings carrying substantially the whole of the hoop stress and the keepers carrying substantially the whole of the longitudinal stress.

From yet another aspect the invention lies in a flexible pipe comprising two sets of stress bearing elements, each set extending substantially the whole length of the pipe, one of the sets of the pipe elements being constructed and arranged so as to be capable of accommodating the whole of the maximum hoop stress resulting from the flow of pressurised fluid through the pipe, and the other set of elements being constructed and arranged so as to accommodate the whole of the corresponding longitudinal stress, the set of elements designed to carry the hoop stress being in the form of interengaging rings, and the elements designed to accommodate longitudinal stress being in the form of a plurality of wires extending axially along within the interior of the pipe and supported therein by a plurality of spaced spiders.

The rings are preferably of high tensile steel such as forged steel of grade X70 and the keepers may be of the same or similar material. Alternatively high strength aluminium bronze may be employed, or a high strength plastics material such as Nylon.

Preferably the narrow resilient bars, or keepers, are arranged as a series of segmental bars which extend longitudinally of the pipe, each bar engaging and holding a pair of adjacent rings. The bars may be staggered so that circumferentially adjacent bars do not engage the same pair of rings. One bar may engage one pair of rings and the adjacent bar may engage one of the rings of that pair and the next adjacent ring.

Preferably the keepers are sufficiently resilient or thermally expandable to enable them to be sprung onto the rings. Means may be provided at the ends of the bars and projecting radially from the rings to allow interengagement between the keeper bars and the rings. Preferably the means comprises wedging surfaces at the ends of each bar and corresponding wedging surfaces projecting outwardly radially from the rings so that axial movements of the rings tighten their engagement with the keeper bars.

In addition to the one or more inner fluid-tight liners there may be a further inner stainless steel coiled or corrugated core to provide support for the inner flexible liners.

The outer cover may be of extruded elastomeric material such as natural rubber, synthetic rubber or plastic and the elastomeric inner sleeves may be of similar material, in each case forming a fluid impermeable layer. Examples of suitable materials are reinforced or unreinforced polyurethane or polyamide.

The inner coiled liner may be a conventional helically wound core tube made from stainless steel strip or other corrosion resistance metal. It may be anchored at both ends by welding.

The segmental keeper bars may be loosely held in place by steel bands engaging in grooves in the bars.

In an alternative arrangement the segmental keeper bars are of relatively light construction, not designed to take the longitudinal stress, and the end-wise stress is taken by an inner cable or wire, or plurality of wires such as piano wires, preferably encased in a sheath of plastic material such as polypropylene. The inner cable or wires may be supported at its ends by means of spiders which may also carry an adjusting means to allow the tension of the inner cable or wire to be adjusted.

At each end of the pipe a flange joint may be provided to enable the pipe to be connected to adjacent lengths of pipe or to an oil well terminal or receiving buoy or ship.

In the accompanying drawings.

Figure 1:
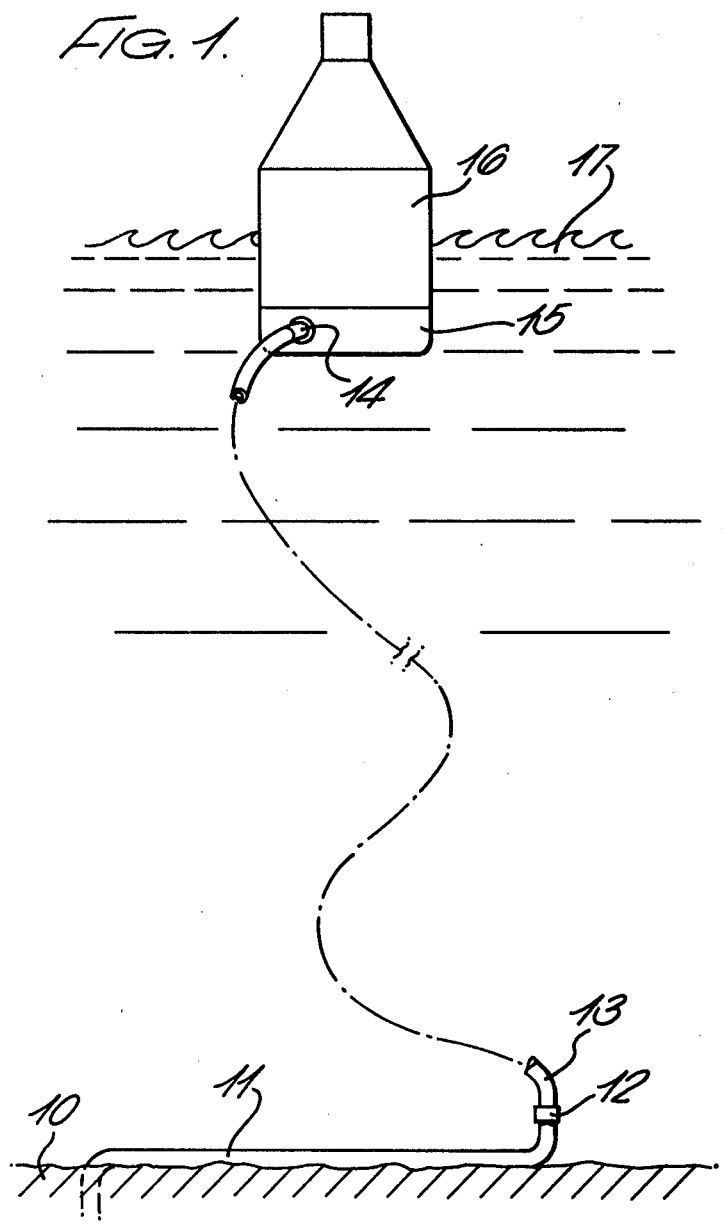
FIG. 1 illustrates very diagrammatically an under-sea oil well terminal connected to a floating buoy by means of a flexible pipe embodying the present invention.

In FIG. 1 of the drawings is shown, very diagrammatically, an under-sea oil terminal which includes a pipe 11 coming from a capped oil well (not shown) below the sea bed 10. The pipe 11 is connected by a pipe joint 12 to a long flexible pipe 13 (shown broken in the middle to illustrate considerable length). The upper end of the flexible pipe 13 is attached by a joint 14 to a tank 15 contained in a buoy 16 floating on the surface of the sea 17 located and maintained in position by any conventional means.

The buoy 16 is shown diagrammatically and would, in practice, be a very large buoy adapted to form a terminal from which oil could be drawn into tankers and other ships. Alternatively, the pipe might connect to a ship or tanker directly.

The oil below the sea bed is often at a very high pressure of the order of 4000/8000 lb per sq. inch, or more and the flexible pipe 13 would be subjected not only to this high internal pressure but to constant flexures and movements due to sub-surface currents and wave movements. Consequently this pipe has to be able to stand up to considerable flexing and stresses in addition to the very high hoop stress and longitudinal stresses set up internally by the pressure from the well.

The illustrated flexible pipe might equally be used for a gas well below the sea surface. It might be used not merely to extract oil but for gas re-injection into a sub-sea well and for water re-injection into a well to pressurise the gas remaining in it when the gas is to be extracted.

It is known to use flexible pipes for conveying oil or gas from the sea bed to an oil rig, but known pipes usually comprise a tough rubber or plastic outer casing reinforced by an inner steel liner in the form of spirally would high tensile steel strip or a series of spirally laid short lengths or steel strip. To produce and wind strip of this kind, able to stand up to the very high pressures and the constant flexures involved, requires expensive and complicated machinery. Furthermore no satisfactory pipe has yet been produced that will stand pressures of the order of 4000/8000 lbs per sq. inch or more without failing when subjected to repeated flexures.

One known kind of pipe has reinforcement in the form of individual strips of high tensile steel laid in helical fashion followed by a second layer of helical strips known as "tension tendons". These are designed to carry the end stress but problems arise when the pipe stretches and the helical strips shrink radially inwards which causes friction, heat and degradation and results in failure of the pipe at very high pressures.

Figure 2:
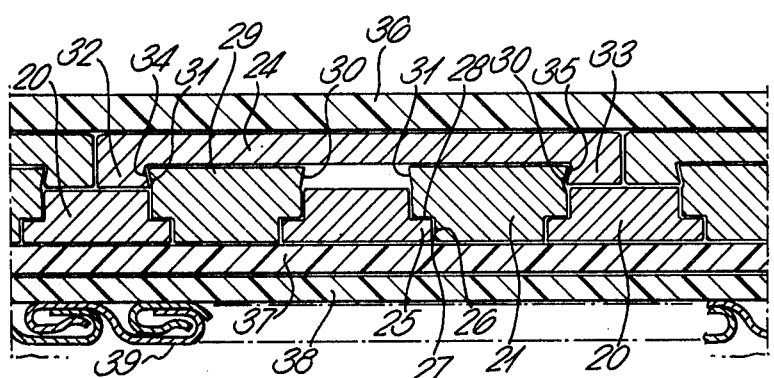
FIG. 2 is a longitudinal section through a portion of a pipe embodying the present invention, the section being shown through one half only of the pipes.
Figure 3:
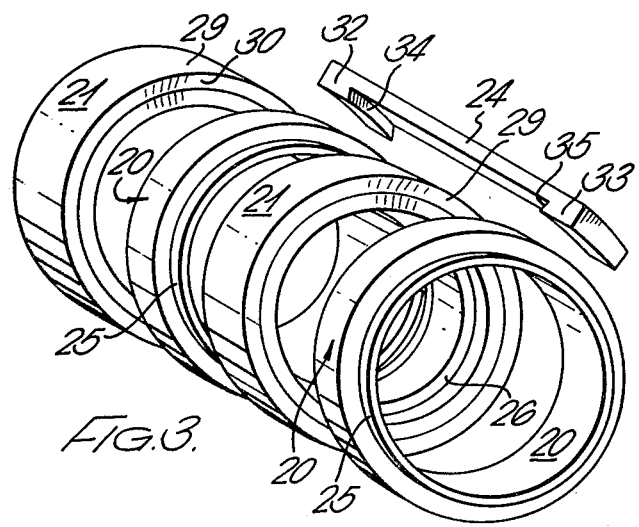
FIG. 3 is a diagrammatic exploded view showing the spigots by which the rings are inter-engaged and also showing a keeper bar.

In the first embodiment of our invention, as illustrated in FIGS. 2 and 3, we provide the desired flexibility by use of a series of high tensile steel rings 20, 21 (see FIGS. 2 and 3) held together by keeper bars 24. The keeper bars 24, to carry all the longitudinal stress must be at least half the thickness of the rings 21. In the present example they are about 0.6 times the ring thickness. The rings 20 and 21 are inter-engaged by spigot connections 25 and 26 which are so dimensioned that there is a clearance 27 in the axial direction and a clearance 28 in the radial direction. The rings 21 have radial extensions 29 with wedge shaped ends providing wedge surfaces 30 and 31. Sets of two or three rings 20 and 21 are engaged and held by keepers 24. Each keeper 24 has a pair of inwardly projecting ends 32 and 33 on which are formed wedge like facing surfaces 34 and 35 respectively.

The method of assembly of these steel rings and keepers will be described in more detail later. They form the central core of the pipe wall. The rings contain the hoop stress and the end-thrust due to internal pressure is carried by the steel keeper bars and these keepers are applied in a staggered fashion (FIG. 7), so that each keeper traps 3 rings. These keepers are sized to carry the total end-thrust and to limit the movement of the pressure carrying rings sufficient that the pipe can be bent to a radius of 5.3 m with the extension (on the outer bend radius) shared uniformly over all pressure rings.

Figure 9:
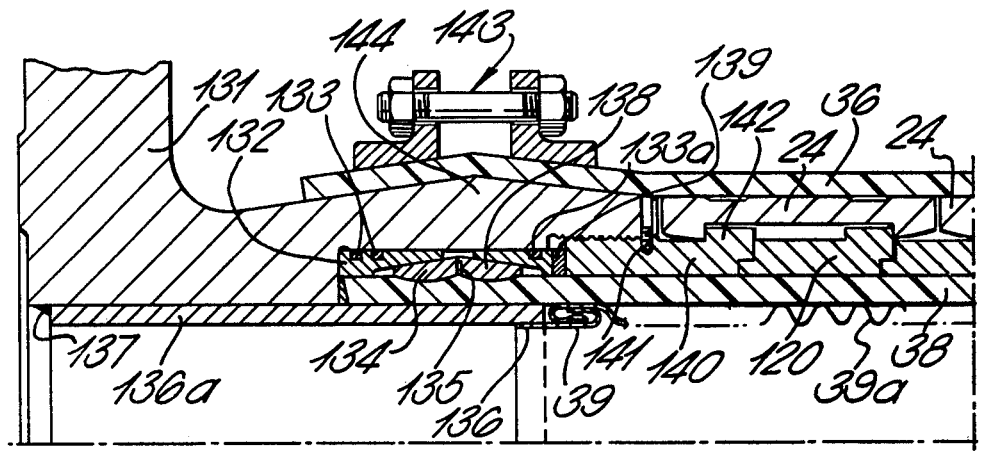
FIG. 9 shows, in longitudinal section, one end joint of the pipe by which it is attached to a flange.

In essence the pipe is similar to the human spinal column, with limited flexibility-the vertebrae being the pressure rings and the tendons uniting the vertebrae, the keepers. Thus flexure does not incur friction. The tongue and groove joints of the pressure rings prevent lateral displacement of the rings (no "slipped discs"). The remaining portions of the wall of the pipe as illustrated comprise an extruded elastomeric outer cover 36, which is fluid tight, and two layers of an elastomeric inner lining 37 and 38 supported by a stainless steel helically coiled core 39, or a corrugated core 39a (FIG. 9).

The pipe shown in FIGS. 2 and 3 thus has a flexible, segmented, pressure-resistant layer. As illustrated the steel rings 20 and 21 are spigoted together with clearances in such a way that they can move both axially and radially but the extent of movement is limited by the use of the keeper bars 24. The keeper bars 24 are staggered circumferentially around the pipe and are sprung on but allow small relative movement in an axial sense to occur and also limit the radial movements of the rings which can occur. The clearances 27 and 28 may for example be of the order of 0.8 mm in a 25 cm internal diameter pipe in which rings 20 may be of the order of 25 mm in length. This will allow the pipe to be bent to a radius of 5.3 m approximately. Being made of high tensile steel the rings 20 and 21 will accommodate and sustain the hoop stress developed by the high pressure of the oil or gas in the pipe.

In this embodiment the keepers 24, also being made of high tensile steel are designed to be thick enough and strong enough to withstand the end-wise or axial loading on the pipe, but this is not essential if alternative means are provided to accommodate end-wise stress as in the embodiment shown in FIGS. 11 to 17 described later.

The rings 20 and 21 are preferably made by forging the rings from high tensile steel and then machining the surfaces to the required degree of accuracy to ensure that the small clearances between the rings are maintained. Alternatively the rings might be cast to approximate shape and then machined to final shape, or precision cast.

Figure 4:
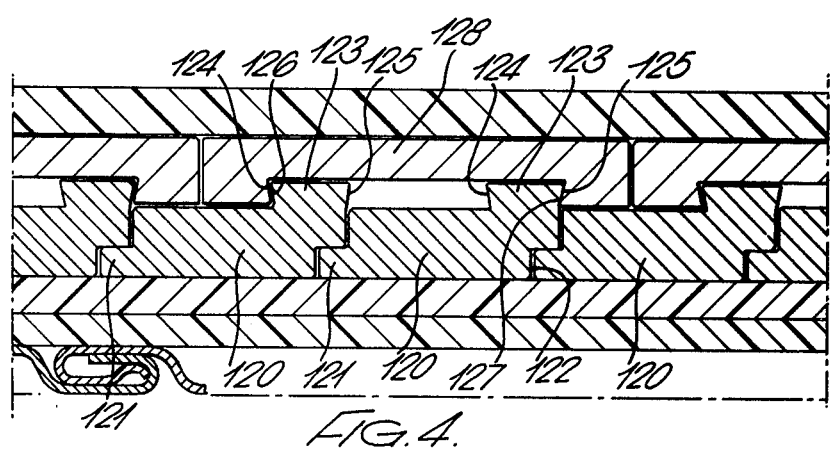
FIG. 4 is a section similar to FIG. 2 but showing an alternative form of the rings.
Figure 5:
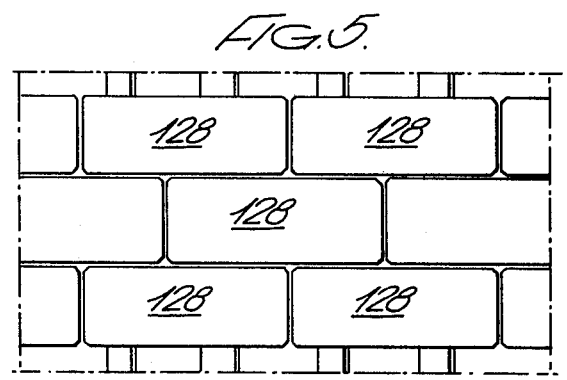
FIG. 5 is a scrap external view of the pipe portion shown in FIG. 4.

In FIG. 4 is shown an alternative embodiment in which the rings 120 are all of the same cross sectional shape. The rings are designed so that they are non-symmetrical in the sense that there is a spigot 121 at one end of each ring and a corresponding recess or groove 122 at the other end of each ring. Again the rings are arranged with axial and radial gaps between them. Each ring 120 has a radial extension 123 which provides a pair of wedge like surfaces 124, 125 or engagement by corresponding wedge like surfaces 126 and 127 on keeper bars 128. The keeper bars embrace only two rings in this instance and are staggered circumferentially as illustrated in FIG. 5.

Figure 6:
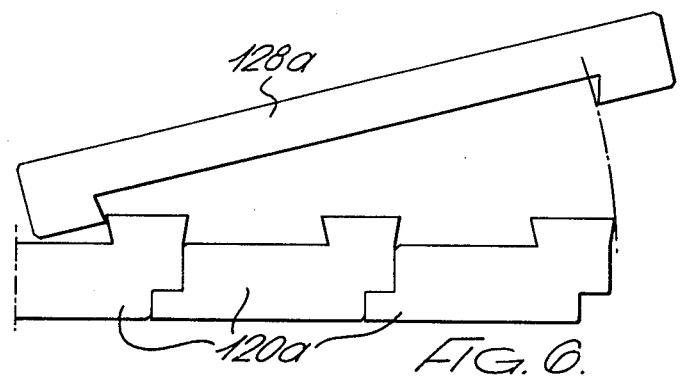
FIG. 6 is a diagrammatic illustration of the way in which the keeper bars or tendons are fitted over the rings.

FIG. 6 shows how a keeper bar is applied. In this instance three rings 120a (shown diagrammatically) are embraced by a single keeper bar 128. The rings are brought close together, closing up the gaps between them and then the bar 128a is sprung over the wedge surfaces at the ends of the bars. There is sufficient clearance to allow the rings limited freedom of axial movement but the keeper bars retain the rings within these limits.

Figure 7:
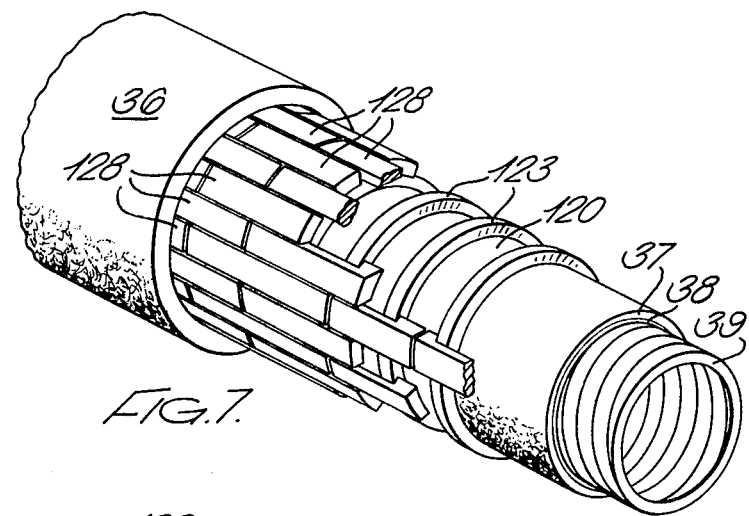
FIG. 7 is a perspective, broken away, view of a portion of the pipe.

FIG. 7 shows diagrammatically how a flexible pipe in accordance with this invention is built up. The stainless steel helically coiled core 39 provides support for the two elastomeric inner lining layers 38 and 37. The rings 120 (in this instance of the type shown in FIG. 4) are slid onto the lining 37 so that their spigot ends interengage loosely.

The keeper bars 128 are then applied, as described with reference to FIG. 6 (but in this example stradling only two rings) and are built up in the pattern shown in FIG. 7 so that the keepers or keeper bars 128 are staggered circumferentially around the pipe.

The assembly can then be completed by use of an extruded plastic cover 36. If required, in order to maintain the assembly in place while the plastic cover is extruded steel bands may be encircled round the keeper bars 128.

Figure 8:
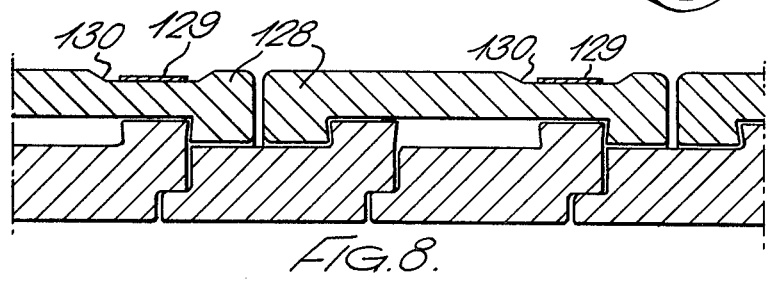
FIG. 8 illustrates, in diagrammatic section, an optional feature by which the keeper bars are kept in place by stainless steel straps.

To facilitate the application and retention of these stainless steel bands the keeper bars may be provided, as shown in FIG. 8 with recesses 130 which are arranged to align with each other so that a single steel band 129 can be arranged to encircle all of the keeper bars. This can be repeated at intervals as illustrated in FIG. 8.

The way in which the flexible pipe may be attached to an end fitting with a flange will now be described with reference to FIG. 9. The flanged end fitting 131 first receives a steel end ring 132 which has pressure tight 'O' rings 133 of elastomeric material. Then a flexible steel band 134 is inserted. This band has a gap 135 to allow it to flex readily.

The elastomeric liner 38 and stainless steel core 39 are then fed into the flanged end fitting 131 and an extension piece 136a is then welded at 137 to the flanged end fitting 131 to hold the core in place.

A second end ring 132 again with 'O' ring seal 133a is then inserted. An appropriately dimensioned washer 139 is then added and a steel plug 140 screwed in so as to tighten up the end assembly. This causes the member 134 to flex and grip the liners 37 and 38 firmly. The plug 140 includes a grub screw 141 to hold it in position.

It will be noted that the plug 140 is formed with an end 142 similar to the ends of the rings 120 previously described.

A series of rings 120 are then slid over the assembly and the keeper bars 24 are applied as previously described.

When the extruded elastomeric outer cover 36 is applied it may be held firmly in place by means of a clamp 143 of conventional design which holds the cover 36 against an enlarged diameter portion 144 of the flanged end fitting 131. A steel backing tube 136A is inserted to provide a firm backing or support when tightening clamp 143.

Figure 10:
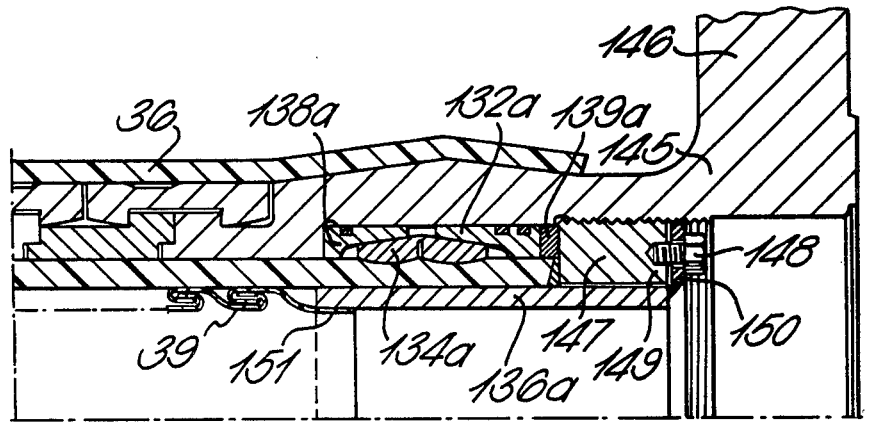
FIG. 10 is similar to FIG. 9 but shows the other end joint connection to a flange.

The other end of the flexible pipe is completed with a similar fitting as shown in FIG. 10. Here there is a flange fitting 145 with an integral flange 146. Similar end rings 132a and 138a are employed together with a flexible steel band 134a. Again a steel washer 139a is employed and a screwed-in plug 147.

When this end assembly has been completed, in a similar manner to that described with reference to FIG. 9, the end plug 147 is locked in position by bolts 148 which squeeze together parts 149 and 150 of the screwed end plug 147. Again the inner core is welded at 151 to the end plug to complete the assembly and the outer cover may be clamped in position by means of a clamp (not shown) similar to that illustrated in FIG. 9.

Figure 11:
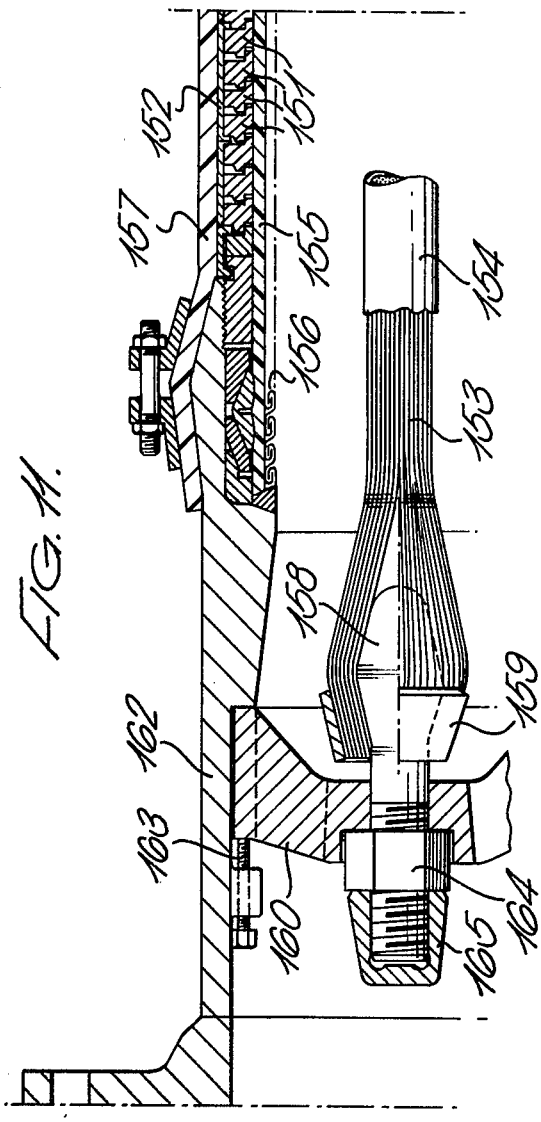
FIG. 11 is a section through half of another pipe incorporating an alternative embodiment of the invention, including a central cable made up of piano wires in a polypropylene sheath.

In the alternative embodiment shown in FIG. 11 a series of inter-engaging rings 151 are used which are held together in groups of four by thin light-weight keepers 152. In this instance the rings 151 are sufficiently thick and are of sufficiently high tensile strength to withstand the hoop stress in the pipe but the keepers 152 are thin and flexible and would not normally be sufficiently strong to withstand the maximum end-wise stress.

To deal with the end-wise stress a number of piano wires are bunched together to form a cable 153 which is covered with a polypropylene sheath 154.

Figure 12:
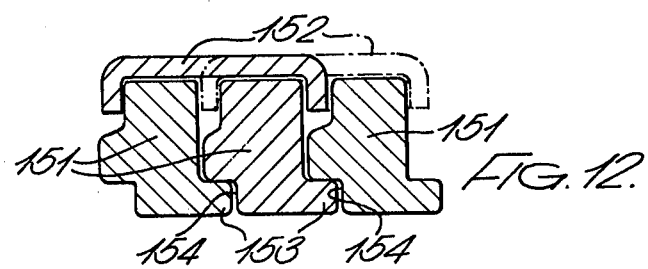
FIG. 12 is an enlarged diagrammatic drawing of the rings and keepers of this embodiment.
Figure 13:
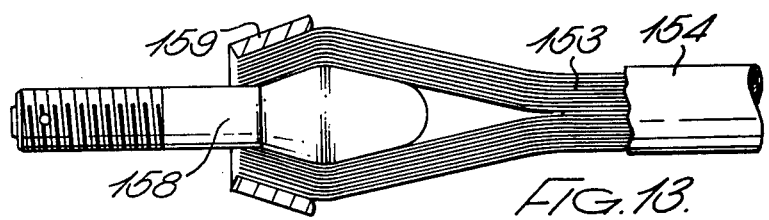
FIG. 13 is a cut-away portion of the end of the central cable and shows how the piano wires are attached to a ferrule.

The keepers 152 may embrace four rings as shown in FIG. 11, or as shown in FIG. 12 only two rings, but they are staggered circumferentially as previously described. As seen in FIG. 12 the rings 151 have inter-engaging spigot members 153 and recesses 154 and also have small axial and radial spacings as described in the previous embodiment.

The cable includes an inner flexible liner 155 and a stainless steel spirally wound core 156 in addition to the outer polyamide extruded coating 157.

The cable 153 is carried at its end by a steel cotter pin 158 with a bulbous end which is attached to the cable by means of a ferrule 159 which may be vacuum impregnated with epoxy resin.

Figure 14:
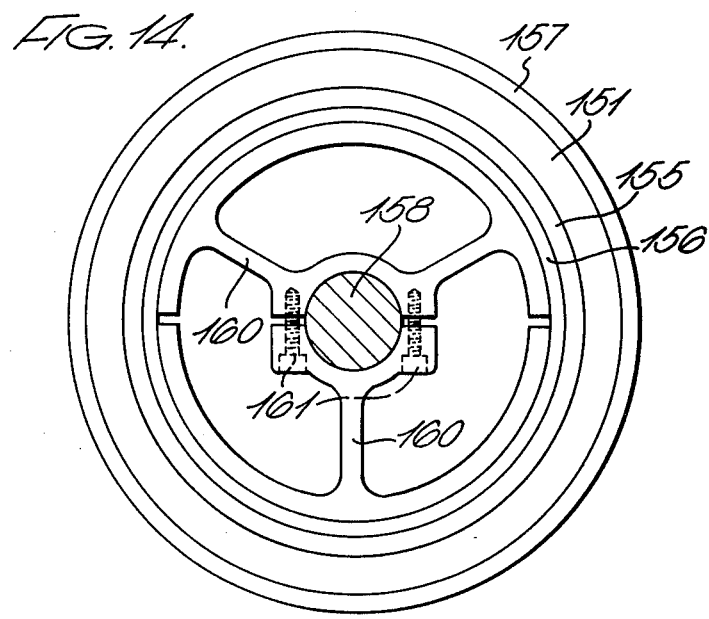
FIG. 14 is an elevation of a spider with a cable in the middle shown in section.

As seen in FIG. 14 the cotter pin 158 is attached to a spider 160 and held fast by bolts 161. The spider is gripped in a flanged end member 162 FIG. 11 by set screws 163. The position of the spider may be adjusted to vary the tension on the cable 153. This may be achieved by tightening up a nut 164. A gauge nut 165 is employed to check the tension. It should be noted that with this design it is not possible for the pipe to be 'pigged' whereas with the embodiments shown in FIG. 1 since there is a clearance down the central bore of the pipe it can be pigged (i.e. a cleaning device can be drawn through the pipe end-to-end down the central bore).

In the second embodiment using the cable to contain the end wise stresses, it will be noted that since the cable is centrally disposed it is on the neutral axis during flexure. The hoop stress is resisted by pure tensile stress in the separate rings.

The central tension cable can comprise a bundle of, for examble, 788 16-gauge piano wires helically wound and bonded to the ferrules at each end. The cable can be subjected before installation to tensioning by means of a hydraulic stud tensioner. The end fittings for this embodiment of the flexible pipe are exactly as illustrated in FIGS. 9 and 10. A number of spiders are arranged at intervals of 1 to 1½ meters all the way along the cable, the spiders being of the type shown in the drawings.

I claim:

1. A flexible pipe comprising first means including a first set of stress bearing elements extending substantially the whole length of the pipe, for accommodating maximum hoop stress resulting from flow of pressurized fluid through the pipe, and second means including a second set of stress bearing elements in the form of a series of keepers circumferentially staggered around said first set of elements which are arranged to hold said first set of elements in place and limit relative movement thereof extending substantially the whole length of the pipe for accommodating longitudinal stress resulting from a flow of pressurized fluid through the pipe.

2. The pipe of claim 1 wherein said keepers are in the form of narrow resilient bars.

3. A flexible pipe comprising a plurality of loosely interengaged rings which allow limited relative axial and radial movement, thus permitting the pipe to flex both radially and longitudinally, the rings being held in place by a plurality of keepers arranged externally of the rings and extending longitudinally of the pipe, the keepers being arranged both to hold the rings in place and to limit the relative movement of the rings, the pipe also including an outer fluid type covering and at least one inner fluid type liner, the rings being so constructed and arranged and being of such thickness and tensile strength as to withstand the maximum hoop stress developed internally in the pipe when high pressure fluid is flowing through it, and the keepers being of sufficient high tensile strength to withstand the endwise or longitudinal stresses developed in the pipe when fluid is flowing through it, the rings carrying substantially the whole of the hoop stress and the keepers carrying substantially the whole of the longitudinal stress.

4. A flexible pipe comprising a plurality of rings which are loosely inter-engaged so as to allow limited relative axial and radial movement, thus permitting the pipe to flex both radially and longitudinally, the rings being held in place by a plurality of keepers which extend longitudinally of the pipe and are arranged both to hold the rings in place and to limit the relative movement of the rings, the pipe also including an outer fluid tight covering and at least one inner fluid tight liner, the inter-engaging rings being of such thickness and tensile strength as to withstand the hoop stress developed internally in the pipe when high pressure fluid is flowing through it, and the keepers being of sufficiently high tensile strength to withstand the endwise or longitudinal stresses developed in the pipe by fluid flowing through it.

5. The pipe of claim 4 wherein said keepers are arranged as a series of segmental bars extending longitudinally of the pipe, each bar engaging and holding a pair of adjacent rings.

6. The pipe of claim 5 wherein said bars or keepers are staggered so that adjacent bars do not engage the same pair of rings, the staggering being circumferentially around the pipe.

7. The pipe of claim 6 wherein one keeper bar engages one pair of rings and the next circumferentially adjacent bar engages one of that pair of rings and the next axially adjacent ring.

8. The pipe according to any of claims 6 or 7 wherein said keepers are sufficiently resilient to enable them to be strung onto the rings.

9. The pipe of claim 5 further comprising means for permitting interengagement between the keeper bars and the rings, wherein said means comprises wedging surfaces at the end of each bar and corresponding wedging surfaces projecting outwardly radially from the rings so that axial movement of the rings tightens their engagement with the keeper bars.

10. The pipe of claim 4 further comprising a steel helically wound core for providing support for said at least one inner fluid tight liners.

11. The pipe of claim 4 wherein said outer covering is of extruded elastomeric material.

12. The pipe of claim 5 wherein the keeper bars are loosely held in place by steel bands engaging grooves in the bars and extending circumferentially around the pipe.

13. The pipe of claim 4 further comprising an inner cable, wire or plurality of wires extending axially along the central space within the pipe and supported therein by a plurality of spiders for containing end wire stresses.

14. The pipe of claim 13 further comprising means for adjusting the tension on the inner cable or wire.

15. The pipe of claim 4 further comprising a flanged joint at each end of the pipe for enabling the pipe to be connected to an adjacent length of pipe or to an oil or gas well terminal or to a receiving buoy or ship.

16. The pipe of claim 15 wherein the end flanged joint is attached to the pipe by means including a pair of sealed end rings for engaging a resilient metal ring, and wherein a metal plug, when tightened into the end flanged joint, causes the end rings to press inwardly upon the resilient metal ring and engage the inner liners so as to seal them.

17. The pipe of claim 16 wherein the screwed-in plug in the end flanged joint (fitting) also forms the first of the metal rings which are held in place by the keepers.

18. The flexible pipe of claim 4 installed in an under-sea oil well installation so as to connect an under-sea oil terminal to a buoy or ship or other oil receiving point on the surface of the sea.

* * * * *